US011945223B2

(12) United States Patent
Ozaki et al.

(10) Patent No.: US 11,945,223 B2
(45) Date of Patent: Apr. 2, 2024

(54) HEAD DEVICE, LIQUID JETTING APPARATUS, AND HEAD MAINTENANCE METHOD

(71) Applicant: FUJIFILM Corporation, Tokyo (JP)

(72) Inventors: Yuichi Ozaki, Kanagawa (JP); Jun Yamanobe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 43 days.

(21) Appl. No.: 17/707,889

(22) Filed: Mar. 29, 2022

(65) Prior Publication Data

US 2022/0219458 A1 Jul. 14, 2022

Related U.S. Application Data

(63) Continuation of application No. PCT/JP2020/036171, filed on Sep. 25, 2020.

(30) Foreign Application Priority Data

Sep. 30, 2019 (JP) ................................ 2019-179130

(51) Int. Cl.
*B41J 2/165* (2006.01)
*B41J 2/045* (2006.01)

(52) U.S. Cl.
CPC ........ *B41J 2/16535* (2013.01); *B41J 2/04596* (2013.01); *B41J 2002/1655* (2013.01); *B41J 2002/1657* (2013.01)

(58) Field of Classification Search
CPC ................ B41J 2/16535; B41J 2/04596; B41J 2002/1655; B41J 2002/1657
See application file for complete search history.

(56) References Cited

U.S. PATENT DOCUMENTS

| | | | |
|---|---|---|---|
| 10,046,558 | B1 | 8/2018 | Darling |
| 2019/0111701 | A1 | 4/2019 | Aikawa et al. |

FOREIGN PATENT DOCUMENTS

| | | | |
|---|---|---|---|
| CN | 104786659 | 7/2015 | |
| JP | 2008-221534 | * 9/2008 | ............. B41J 2/165 |

(Continued)

OTHER PUBLICATIONS

"International Search Report (Form PCT/ISA/210) of PCT/JP2020/036171," dated Dec. 8, 2020, with English translation thereof, pp. 1-5.

(Continued)

*Primary Examiner* — Geoffrey S Mruk
(74) *Attorney, Agent, or Firm* — JCIPRNET

(57) ABSTRACT

To provide a head device, a liquid jetting apparatus, and a head maintenance method with which it is possible to suppress a decrease in performance of a liquid-repellent film on a nozzle surface that is caused by a wiping process with respect to the nozzle surface. Provided is a head device including an ink jet head (10) in which a liquid-repellent film (10B) is formed on a nozzle surface (10A) and a head control unit. The head control unit applies a negative pressure to liquid in a nozzle, performs a non-jetting driving operation of causing the liquid in the nozzle to vibrate without being jetted, and stops the non-jetting driving operation for a wiping target nozzle (12A) with which a wiping member (22) to be used in a wiping process comes into contact in a case where the wiping process with respect to the nozzle surface is to be performed.

12 Claims, 10 Drawing Sheets

(56) References Cited

FOREIGN PATENT DOCUMENTS

| | | |
|---|---|---|
| JP | 4488342 | 6/2010 |
| JP | 2013199021 | 10/2013 |
| JP | 2015071231 | 4/2015 |
| JP | 2016030366 | 3/2016 |
| JP | 2019073010 | 5/2019 |
| JP | 2019163432 | 9/2019 |
| WO | 2019054149 | 3/2019 |

OTHER PUBLICATIONS

"Written Opinion of the International Searching Authority (Form PCT/ISA/237)" of PCT/JP2020/036171, dated Dec. 8, 2020, with English translation thereof, pp. 1-8.
"Office Action of Japan Counterpart Application" with English translation thereof, dated May 24, 2023, p. 1-p. 8.
"Notice of Reasons for Refusal of Japan Counterpart Application", dated Sep. 14, 2023, with English translation thereof, p. 1-p. 8.

* cited by examiner

HEAD DEVICE, LIQUID JETTING APPARATUS, AND HEAD MAINTENANCE METHOD

CROSS-REFERENCE TO RELATED APPLICATIONS

The present application is a Continuation of PCT International Application No. PCT/JP2020/036171 filed on Sep. 25, 2020 claiming priority under 35 U.S.C § 119(a) to Japanese Patent Application No. 2019-179130 filed on Sep. 30, 2019. Each of the above applications is hereby expressly incorporated by reference, in its entirety, into the present application.

BACKGROUND OF THE INVENTION

1. Field of the Invention

The present invention relates to a head device, a liquid jetting apparatus, and a head maintenance method.

2. Description of the Related Art

There is known an ink jet printing apparatus including an ink jet head. The ink jet printing apparatus performs a driving operation in which a meniscus is vibrated to such an extent that ink is not jetted from a nozzle, so that deterioration of the ink that is caused by the ink drying in the nozzle is suppressed. Such a driving operation is called a tickling operation, a meniscus shaking operation, and the like.

In the ink jet printing apparatus, a wiping operation is performed on a nozzle surface of the ink jet head to remove foreign substances such as ink mist adhering to the nozzle surface and to suppress a decrease in jetting performance that is caused by the foreign substances adhering to the nozzle surface. For the wiping operation, a wiping member such as a web sheet, to which a non-woven fabric or the like is applied, and a blade, to which rubber or the like is applied, is applied.

In a case where the tickling operation is performed during the wiping operation, the amount of ink drawn from the nozzle to the wiping member may be large in comparison with a case where the tickling operation is not performed. In the case of the ink jet head to which ink having a component that easily scrapes a liquid-repellent film formed on the nozzle surface is applied, deterioration of the liquid-repellent film is accelerated due to the wiping operation.

Described in JP2016-30366A is an ink jet printing apparatus including a wiper that wipes a nozzle surface. The apparatus described in JP2016-30366A drives a nozzle, with which the wiper is not in contact, in a case where the nozzle surface is wiped by means of the wiper so that the pressure of a pressure chamber communicating with a nozzle with which the wiper is in contact is reduced. Accordingly, a meniscus of the nozzle with which the wiper is in contact is pulled into the nozzle and ink leakage caused by the destruction of the meniscus is suppressed.

Described in JP4488342B is an ink jet printing apparatus including a wiper that wipes a nozzle surface. The apparatus described in JP4488342B performs a wiping operation while applying pulsation to ink to such an extent that the ink is not jetted, so that wiping failure such as unwiped residue is suppressed.

Described in JP2015-71231A is an ink jet printing apparatus including a maintenance device for an ink jet head. In the case of the apparatus described in JP2015-71231A, a negative pressure during maintenance of the ink jet head is set to fall within a range of −0.8 kilopascals to −0.1 kilopascals.

SUMMARY OF THE INVENTION

However, in the case of the invention described in JP2016-30366A, ink is jetted from a nozzle with which the wiper is not in contact and the ink jetted from the nozzle adheres to the wiper. In the case of the invention described in JP4488342B, ink adheres to the wiper at the time of the wiping operation.

In the case of the invention described in JP2015-71231A, ink leaks from a nozzle at the time of a wiping operation. The ink leaking from the nozzle adheres to a wiper. In such a case, particles contained in the ink may scrape a liquid-repellent film on a nozzle surface and the liquid-repellent film may be worn in a case where the wiping operation is performed by means of the wiper to which the ink adheres.

The present invention has been made in consideration of such circumstances and an object of the present invention is to provide a head device, a liquid jetting apparatus, and a head maintenance method with which it is possible to suppress wear of a liquid-repellent film on a nozzle surface that is caused by a wiping process with respect to the nozzle surface.

In order to achieve the above-described object, the following aspects of the invention are provided.

According to a first aspect, there is provided a head device including an ink jet head in which a liquid-repellent film is formed on a nozzle surface and a head control unit that controls the ink jet head. The head control unit applies a negative pressure to liquid in a nozzle, performs a non-jetting driving operation of causing the liquid in the nozzle to vibrate without being jetted, and stops the non-jetting driving operation for a wiping target nozzle with which a wiping member to be used in a wiping process comes into contact in a case where the wiping process with respect to the nozzle surface is to be performed.

According to the first aspect, the non-jetting driving operation for the wiping target nozzle is stopped. Accordingly, the liquid is restrained from being drawn out from the nozzle in contact with the wiping member to the nozzle surface and thus wear of the liquid-repellent film formed on the nozzle surface and a decrease in performance of the ink jet head can be suppressed.

As the wiping member, an absorbent member having a function of absorbing liquid may be applied. An example of the absorbent member is a web sheet.

The wiping of the nozzle surface may be performed by moving the ink jet head relative to the wiping member in a stopped state or by moving the wiping member relative to the ink jet head in a stopped state.

According to a second aspect, in the head device related to the first aspect, the head control unit may continue the non-jetting driving operation for a non-target nozzle with which the wiping member is not in contact.

According to the second aspect, the non-jetting driving operation for the non-target nozzle is performed. Accordingly, liquid is restrained from being dried in the non-target nozzle.

According to a third aspect, in the head device related to the first aspect, the ink jet head may include a plurality of head modules and have a structure in which the plurality of head modules are connected to each other and the head control unit may stop the non-jetting driving operation for a wiping target head module, to which the wiping target nozzle belongs, in a case where the wiping process is to be performed.

According to the third aspect, control of the non-jetting driving operation in accordance with the wiping process can be performed for each head module.

According to a fourth aspect, in the head device related to the third aspect, the head control unit may continue the non-jetting driving operation for a non-target head module other than the wiping target head module.

According to the fourth aspect, the non-jetting driving operation for the non-target head module is performed. Accordingly, liquid is restrained from being dried in a nozzle belonging to the non-target head module.

According to a fifth aspect, in the head device related to the third aspect, the head control unit may stop the non-jetting driving operation for the wiping target head module before a timing at which the wiping member starts to come into contact with the wiping target head module.

According to the fifth aspect, contact between the wiping member and ink in the nozzle can be suppressed more effectively.

Two adjacent head modules may be wiping target head modules. During the wiping process with respect to the wiping target head module for which the wiping process is performed first, the non-jetting driving operation for the wiping target head module for which the wiping process is performed later may be stopped. In other words, the non-jetting driving operation for the wiping target head module to be wiped next may be stopped at any timing at which the wiping member comes into contact with the wiping target head module to be wiped first.

According to a sixth aspect, in the head device related to the fifth aspect, the head control unit may stop the non-jetting driving operation for the wiping target head module at least 0.2 seconds before the timing at which the wiping member starts to come into contact with the wiping target head module.

According to the sixth aspect, it is possible to reliably stop the non-jetting driving operation for the wiping target head module before the wiping member comes into contact with the nozzle surface of the wiping target head module.

According to a seventh aspect, in the head device related to any one of the fourth to sixth aspects, the head control unit may perform the non-jetting driving operation for the wiping target head module after a timing at which contact between the wiping member and the wiping target head module ends.

According to the seventh aspect, contact between the wiping member and ink is reliably suppressed and liquid is restrained from being dried in a nozzle belonging to a head module for which the wiping process is finished.

According to an eighth aspect, in the head device related to the seventh aspect, the head control unit may perform the non-jetting driving operation for the wiping target head module at least 0.2 seconds after the timing at which the contact between the wiping member and the wiping target head module ends.

According to the eighth aspect, contact between the wiping member and the ink is more reliably suppressed and liquid is more reliably restrained from being dried in a nozzle belonging to the head module for which the wiping process is finished.

According to a ninth aspect, in the head device related to any one of the first to seventh aspects, a negative pressure setting unit that sets the negative pressure may set the negative pressure in a case of the wiping process to fall within such a range that the liquid is not drawn out from the nozzle in a case where the non-jetting driving operation is stopped.

According to the ninth aspect, liquid is more reliably restrained from being drawn out from the wiping target nozzle to the nozzle surface.

According to a tenth aspect, in the head device related to the ninth aspect, the negative pressure setting unit may set the negative pressure in the case of the wiping process to −5000 kilopascals or more and −500 kilopascals or less.

According to the tenth aspect, contact between the wiping member and ink in a nozzle is more reliably suppressed.

According to an eleventh aspect, in the head device related to any one of the first to tenth aspects, at least one of liquid containing carbon black or liquid containing titanium oxide may be used for the ink jet head.

According to the eleventh aspect, wear of the liquid-repellent film can be suppressed in the ink jet head to which liquid containing a particle that easily scrapes the liquid-repellent film is applied.

An example of the liquid containing carbon black is black ink. An example of the liquid containing titanium oxide is white ink.

According to a twelfth aspect, there is provided a liquid jetting apparatus including an ink jet head in which a liquid-repellent film is formed on a nozzle surface, a head control unit that controls the ink jet head, and a wiping processing unit that performs a wiping process with respect to the nozzle surface. The head control unit applies a negative pressure to liquid in a nozzle, performs a non-jetting driving operation of causing the liquid in the nozzle to vibrate without being jetted, and stops the non-jetting driving operation for a wiping target nozzle with which a wiping member to be used in the wiping process comes into contact in a case where the wiping process with respect to the nozzle surface is to be performed by the wiping processing unit.

According to the twelfth aspect, the same effect as the effect of the first aspect can be achieved.

In the twelfth aspect, the same items as items specified in the second to eleventh aspects can be appropriately combined. In that case, components for processing or functions specified in the head device can be grasped as components of the liquid jetting apparatus for processing and functions corresponding thereto.

According to a thirteenth aspect, there is provided a head maintenance method of performing a wiping process with respect to a nozzle surface of an ink jet head in which a liquid-repellent film is formed on the nozzle surface, the method including a negative pressure applying step of applying a negative pressure to liquid in a nozzle and a non-jetting driving step of performing a non-jetting driving operation of causing the liquid in the nozzle to vibrate without being jetted. In the non-jetting driving step, the non-jetting driving operation is stopped for a wiping target nozzle with which a wiping member to be used in the wiping process comes into contact.

According to the thirteenth aspect, the same effect as the effect of the first aspect can be achieved.

In the thirteenth aspect, the same items as items specified in the second to eleventh aspects can be appropriately combined. In that case, components for processing or functions specified in the head device can be grasped as components of the head maintenance method for processing and functions corresponding thereto.

According to the aspects of the present invention, the non-jetting driving operation for the wiping target nozzle is stopped. Accordingly, the liquid is restrained from being drawn out from the nozzle in contact with the wiping member to the nozzle surface and thus wear of the liquid-repellent film formed on the nozzle surface and a decrease in performance of the ink jet head can be suppressed.

DESCRIPTION OF THE PREFERRED EMBODIMENTS

Figure 1:
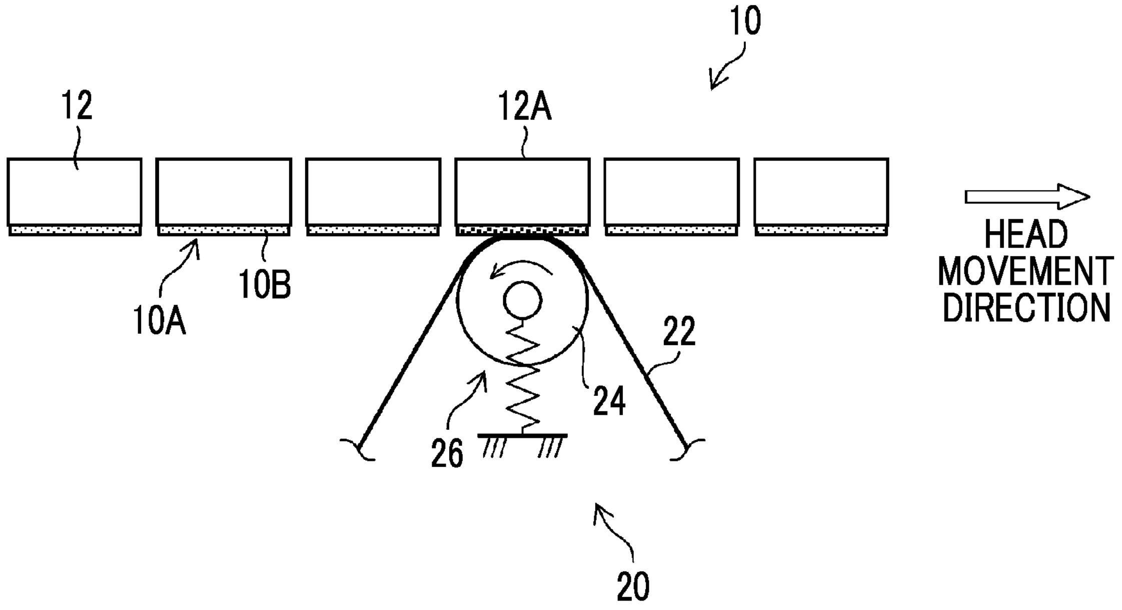
FIG. 1 is a schematic view of a head maintenance method according to an embodiment.

Hereinafter, preferable embodiments of the present invention will be described in detail with reference to the attached drawings. In the present specification, the same components will be given the same reference numerals and repetitive description thereof will be appropriately omitted.

[Head Maintenance Method]

FIG. 1 is a schematic view of a head maintenance method according to an embodiment. Head maintenance shown in FIG. 1 is a wiping process of wiping nozzle surfaces 10A of an ink jet head 10. A liquid-repellent film 10B is formed on each nozzle surface 10A.

The ink jet head 10 has a structure in which a plurality of head modules 12 are connected to each other in a row along a longitudinal direction. The longitudinal direction of the ink jet head 10 is a direction parallel to a head movement direction shown in FIG. 1.

Here, the term "parallelism" in the present specification may also mean a state where two directions that intersect each other in the strict sense are substantially parallel to each other such that the same effect as a state of being parallel to each other is achieved. The same applies to the expression "being orthogonal to each other" and the expression "being orthogonal to each other" may also mean being substantially orthogonal to each other. Note that the number of head modules 12 shown in FIG. 1 may be any number and the number of head modules 12 is not limited to that shown in FIG. 1.

A wiping device 20 brings a web sheet 22 caused to travel into contact with the nozzle surfaces 10A of the ink jet head 10 to wipe the nozzle surfaces 10A. The wiping device 20 includes a pressing roller 24 and a biasing unit 26.

The wiping device 20 includes a storage unit that stores the web sheet 22 in a roll shape. The wiping device 20 includes a recovery unit that winds up and recovers the web sheet 22 that has been used. Note that the storage unit and the recovery unit are not shown.

The pressing roller 24 supports the web sheet 22 in a case where the web sheet 22 is brought into contact with the nozzle surface 10A. The pressing roller 24 is driven to rotate in accordance with travel of the web sheet 22. An arrow shown in FIG. 1 shows a rotation direction of the pressing roller 24. A traveling direction of the web sheet 22 that is in contact with the pressing roller 24 coincides with the rotation direction of the pressing roller 24.

The biasing unit 26 applies, to the pressing roller 24, a force toward the nozzle surfaces 10A to bias the web sheet 22 toward the nozzle surfaces 10A. An elastic member such as a spring may be applied to the biasing unit 26.

In the head maintenance method shown in FIG. 1, the ink jet head 10 is moved in the head movement direction and the web sheet 22 of the wiping device 20, of which the position is fixed, is caused to travel. At the position of the nozzle surfaces 10A, the traveling direction of the web sheet 22 is opposite to a movement direction of the ink jet head 10. Therefore, cleaning effectiveness with respect to the nozzle surfaces 10A can be improved.

Figure 7:
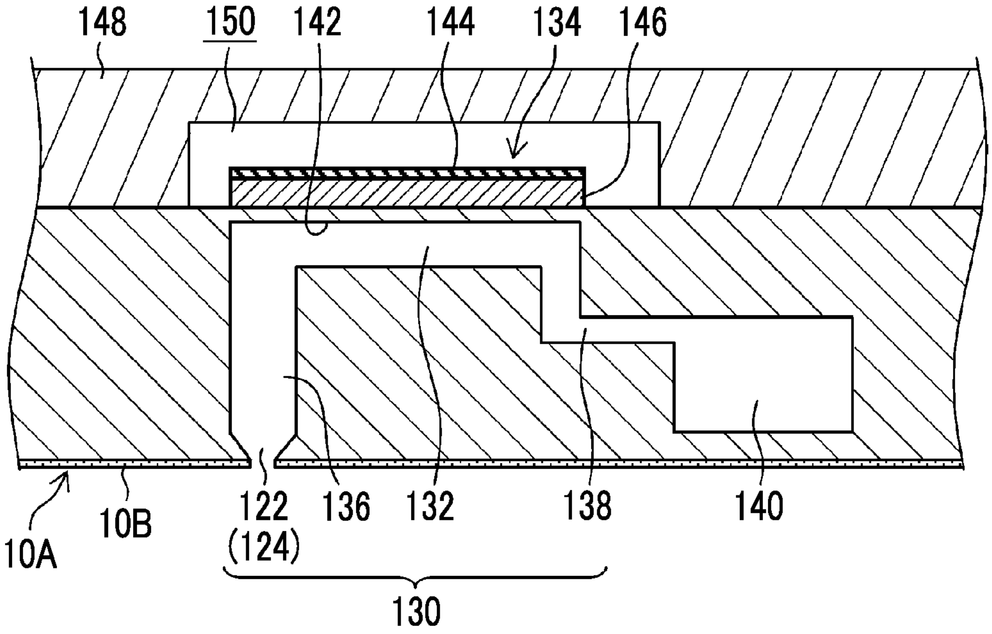
FIG. 7 is a vertical cross-sectional view showing a three-dimensional structure of an ejector of the ink jet head shown in FIG. 5.

In the ink jet head 10, a tickling operation is performed in a case where printing is not performed as in a maintenance process. Accordingly, ink in a nozzle is restrained from being dried in a case where printing is not performed. Note that no nozzle is shown in FIG. 1. Nozzles are given a reference numeral 122 and are shown in FIG. 7.

The tickling operation is a process of vibrating ink in a nozzle without the ink jetted from the nozzle. The expression "the jetting of ink" means a state where ink, of which the volume falls in a prescribed range, is split from the ink in the nozzle and is discharged from the nozzle in the form of a liquid droplet. The tickling operation may be realized by applying a drive voltage, which is lower than a drive voltage in the case of the jetting of ink, to pressure generating elements corresponding to respective nozzles. Note that the tickling operation in the embodiment corresponds to an example of a non-jetting driving operation.

The expression "the jetting of ink" may also mean causing ink mists, each of which has a volume lower than the prescribed range, to be discharged from the nozzles such that the plurality of ink mists are combined outside the nozzles and an ink droplet of which the volume falls in the prescribed range is formed.

Regarding a wiping target head module 12A which is the target of the wiping process with respect to the nozzle surface 10A, the tickling operation is stopped for all nozzles of the wiping target head module 12A. For the head modules 12 other than the wiping target head module 12A, performance of the tickling operation is continued. For the head module 12 after being subjected to the wiping process with respect to the nozzle surface 10A, performance of the tickling operation is restarted.

Regarding the ink jet head 10, the wiping process with respect to the nozzle surfaces 10A is performed in order from the head module 12 that is positioned at a downstream end in the head movement direction. The tickling operation is switched on and off for each head module 12.

Accordingly, ink is restrained from being drawn out from a nozzle of the wiping target head module 12A to a nozzle surface and thus wear of the liquid-repellent film 10B that is caused by contact between a pigment contained in the ink and the liquid-repellent film 10B may be suppressed.

Particularly, black ink containing carbon black and white ink containing titanium oxide may accelerate wear of the liquid-repellent film 10B in comparison with ink containing other pigments. The head maintenance method in the present embodiment is suitable for the ink jet head 10 to which black ink containing carbon black is applied and the ink jet head 10 to which white ink containing titanium oxide is applied.

Note that, a nozzle belonging to the wiping target head module 12A in the embodiment corresponds to an example of a wiping target nozzle. The head module 12 other than the wiping target head module 12A in the embodiment corresponds to an example of a non-target head module other than a wiping target head module. A nozzle belonging to the head module 12 other than the wiping target head module 12A in the embodiment corresponds to an example of a non-target nozzle with which a wiping member is not in contact.

Figure 2:
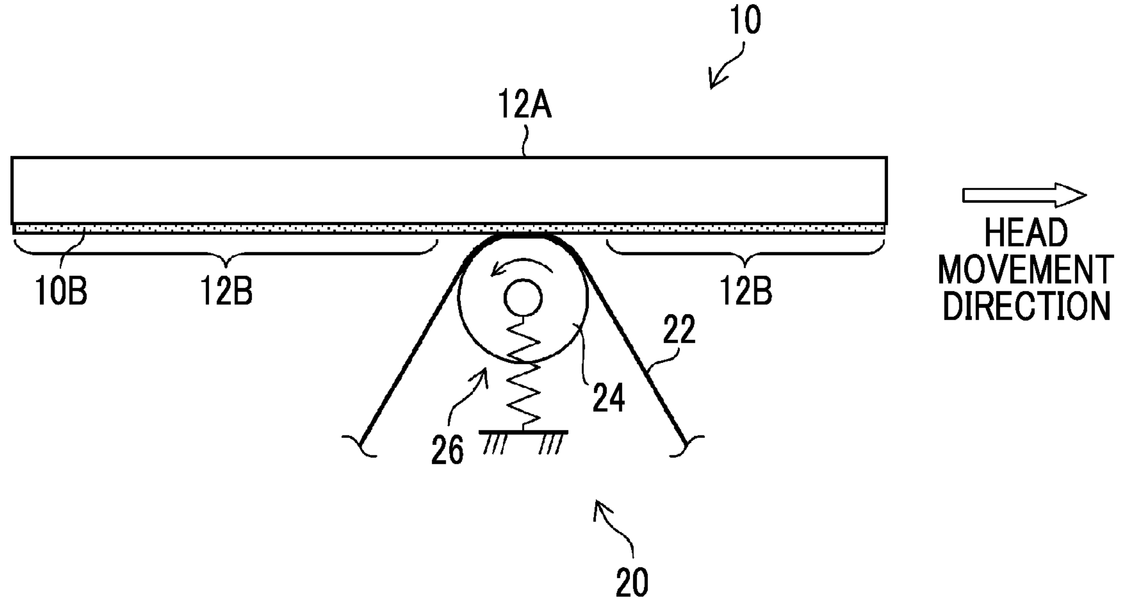
FIG. 2 is a schematic view of a modification example of the head maintenance method shown in FIG. 1.

FIG. 2 is a schematic view of a modification example of the head maintenance method shown in FIG. 1. As shown in FIG. 2, a nozzle for which the tickling operation is not stopped may be set for the wiping target head module 12A. In a tickling continuation region 12B shown in FIG. 2, a nozzle for which the tickling operation is not stopped is disposed. For a nozzle belonging to the tickling continuation region 12B, the tickling operation is continued without being stopped.

The tickling continuation region 12B may be defined in accordance with the position of the wiping device 20 at the wiping target head module 12A, which is derived based on the moving speed of the ink jet head 10 and a timing at which the wiping of the wiping target head module 12A is started. Here, the term “speed” may also mean a speed indicating the absolute value of a speed. Note that a nozzle belonging to the tickling continuation region 12B in the embodiment corresponds to an example of a non-target nozzle with which the wiping member is not in contact.

Figure 3:
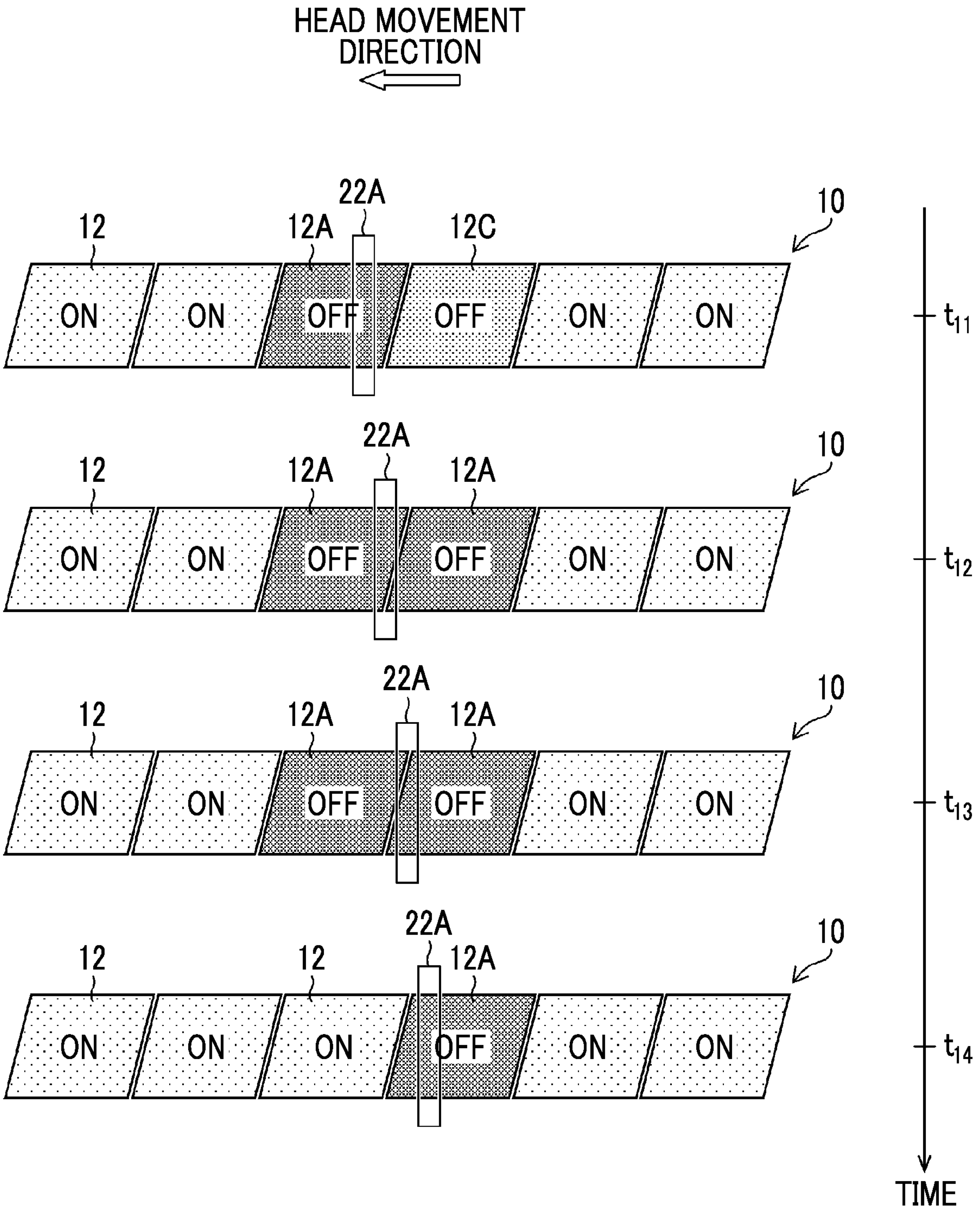
FIG. 3 is a schematic diagram showing a tickling operation stoppage timing.

FIG. 3 is a schematic diagram showing a tickling operation stoppage timing. FIG. 3 shows that transition of performance or stoppage of the tickling operation is made in order of a timing $t_{11}$, a timing $t_{12}$, a timing $t_{13}$, and a timing $t_{14}$ in chronological order.

“ON” of the head module 12 denotes performance of the tickling operation. “OFF” denotes stoppage of the tickling operation. Note that a quadrangular shape with a reference numeral “22A” denotes a web sheet contact region. The web sheet contact region 22A is a region where the web sheet 22 comes into contact with the nozzle surface 10A.

Regarding the ink jet head 10 shown in FIG. 3, the planar shape of each head module 12 is a parallelogram and a boundary line between the head modules 12 adjacent to each other is inclined with respect to a wiping direction. Note that the wiping direction has the same meaning as the movement direction of the ink jet head 10.

For each head module 12, the tickling operation is stopped before the web sheet 22 starts to pass by the head module 12. At the timing $t_{11}$, the tickling operation for the wiping target head module 12A is stopped and the tickling operation for a non-wiping target head module 12C to be wiped next to the wiping target head module 12A is stopped.

That is, for the non-wiping target head module 12C to be wiped next to the wiping target head module 12A, the tickling operation is stopped during a wiping process for the wiping target head module 12A to be wiped before the wiping of the non-wiping target head module 12C.

In other words, the tickling operation for the non-wiping target head module 12C to be wiped next may be stopped at any timing at which the web sheet 22 is in contact with the wiping target head module 12A.

At the timing $t_{12}$ and the timing $t_{13}$, the web sheet 22 comes into contact with two wiping target head modules 12A adjacent to each other in accordance with movement of the ink jet head 10. The non-wiping target head module 12C, which is a target to be wiped next at the timing $t_{11}$, is the wiping target head module 12A at the timing $t_{12}$ and the timing $t_{13}$. In other words, at the timing $t_{12}$ and the timing $t_{13}$, two adjacent head modules 12 are the wiping target head modules 12A.

At the timing $t_{14}$, the tickling operation for the wiping target head module 12A that is positioned on an upstream side in the head movement direction and is one of the two wiping target head modules 12A adjacent to each other at the timing $t_{12}$ and the timing $t_{13}$ is restarted.

At the timing $t_{14}$, after the web sheet 22 completely passes by the wiping target head module 12A, the tickling operation for the head module 12 that is not a target to be wiped and is the wiping target head module 12A at an earlier time is restarted. In this manner, it is possible to reliably avoid contact between the web sheet 22 and ink in the nozzles throughout the wiping process with respect to the nozzle surfaces 10A.

Figure 4:
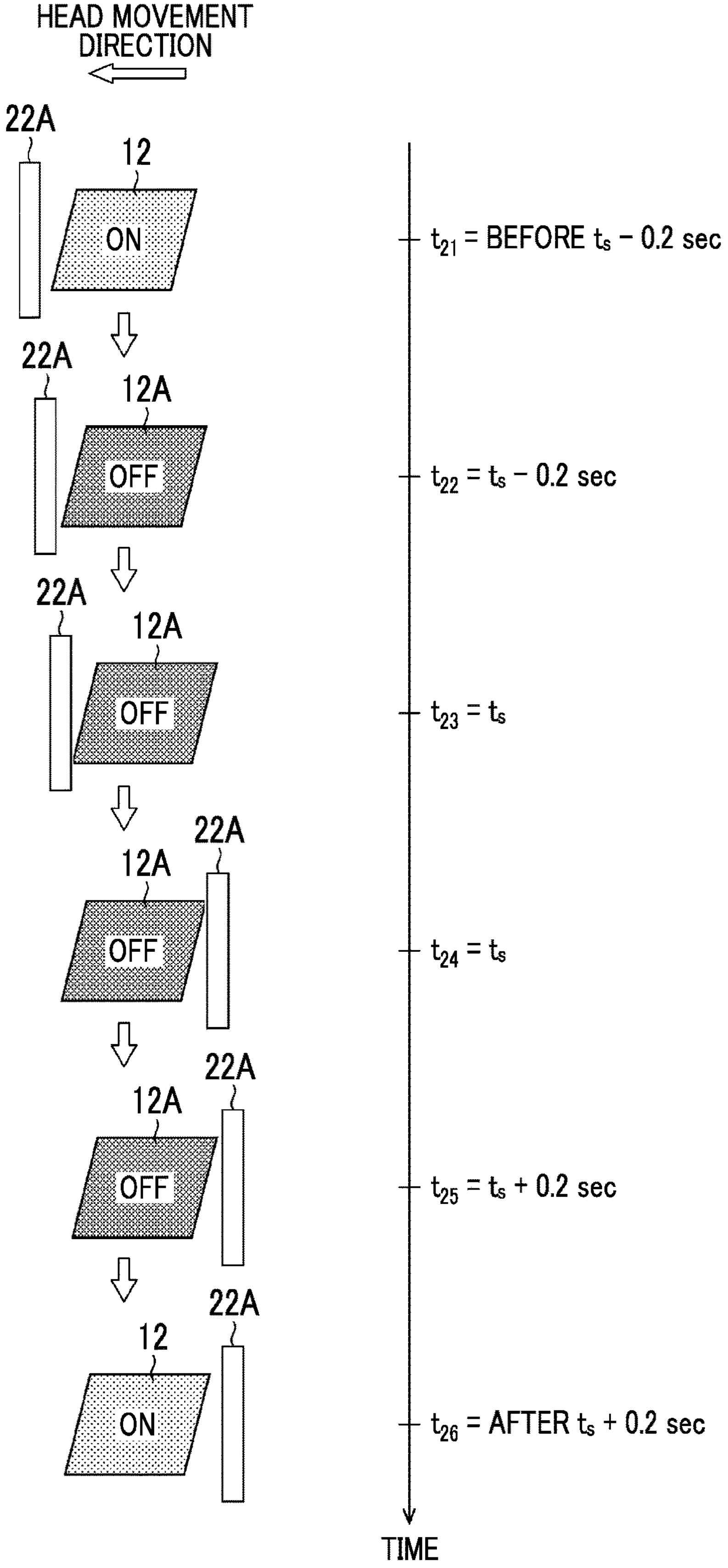
FIG. 4 is a schematic diagram showing a specific example of stoppage of the tickling operation.

FIG. 4 is a schematic diagram showing a specific example of stoppage of the tickling operation. The drawing shows stoppage and restart of the tickling operation in any module in chronological order. A timing $t_{21}$ is a timing that is at least 0.2 seconds before a contact start timing $t_s$. The contact start timing $t_s$ is a timing at which contact between the wiping target head module 12A and the web sheet 22 is started.

A timing $t_{22}$ is a timing that is 0.2 seconds before the contact start timing $t_s$. Before the timing $t_{22}$, the tickling operation for the wiping target head module 12A is stopped. That is, the tickling operation for the wiping target head module 12A is stopped at least 0.2 seconds before the contact start timing $t_s$.

A timing $t_{23}$ is the contact start timing $t_s$. A timing $t_{24}$ is a contact end timing $t_e$. A timing $t_2$ is a timing that is 0.2 seconds after the contact end timing $t_e$. At the timing $t_{25}$, stoppage of the tickling operation for the wiping target head module 12A is maintained.

A timing $t_{26}$ is any timing that is at least 0.2 seconds after the contact end timing $t_e$. For the head module 12 that is the wiping target head module 12A at an earlier time, the tickling operation is restarted at any timing that is at least 0.2 seconds after the contact end timing $t_e$.

That is, for each head module 12, the tickling operation is stopped before a timing that is 0.2 seconds before the contact start timing $t_s$, at which contact between the web sheet 22 and the head module 12 is started, and is restarted after a timing that is 0.2 seconds after the contact end timing $t_e$, at which contact between the web sheet 22 and the head module 12 ends.

A wiping process period for one head module 12 may be set to any period between 1.0 second and 5.0 seconds. A period preceding a tickling operation end timing with respect to the contact start timing $t_s$ may be set to any period between 4.0% and 20% of the wiping process period for one head module 12. The same applies to a tickling operation restart delay period with respect to the contact end timing $t_e$.

[Internal Pressure Control of Ink Jet Head]

A negative pressure is applied to ink inside the ink jet head 10 in the present embodiment. A negative pressure in the case of the wiping process for the nozzle surfaces 10A is set within such a range that no ink is drawn out from a nozzle to a nozzle surface in a case where the tickling operation is stopped. Examples of the negative pressure in the case of the wiping process for the nozzle surfaces 10A include a range of equal to or larger than −5000 kilopascals and equal to or smaller than −500 kilopascals.

The negative pressure in the case of the wiping process for the nozzle surfaces 10A may be increased relative to a negative pressure in the case of printing and may coincide with the negative pressure in the case of printing. The expression "to increase the negative pressure" means "to increase the absolute value of the negative pressure" and has the same meaning as "to decrease a pressure".

[Effect]

According to the head maintenance method in the embodiment, the following effects can be achieved.

[1]

In a case where the ink jet head 10 in which the liquid-repellent films 10B are formed on the nozzle surfaces 10A is wiped, the tickling operation is stopped for a nozzle with which the web sheet 22 comes into contact. Accordingly, ink is restrained from being drawn out from the nozzle to a nozzle surface due to contact between the nozzle and the web sheet 22 in a case where the nozzle surfaces 10A are wiped and thus wear of the liquid-repellent films 10B is suppressed.

[2]

The tickling operation is continued for nozzles that are not in contact with the web sheet 22. Accordingly, ink in the nozzles that are not in contact with the web sheet 22 is restrained from being dried.

[3]

In the ink jet head including the plurality of head modules, the tickling operation is stopped for all of nozzles of the wiping target head module 12A. Accordingly, ink is restrained from being drawn out from the nozzles of the wiping target head module 12A to a nozzle surface due to contact between the web sheet 22 and the nozzles.

[4]

For the head module 12 that is not a wiping process target, the tickling operation is continued. Accordingly, ink in nozzles of the head module 12 not to be wiped is restrained from being dried.

[5]

For the head module 12 that is a target to be wiped next to the wiping target head module 12A, the tickling operation is stopped before the web sheet 22 comes into contact with the head module 12. Accordingly, it is possible to more effectively restrain ink from being drawn out from nozzles to the nozzle surface 10A due to contact between the web sheet 22 and the ink in the nozzles.

[6]

For the wiping target head module 12A, the tickling operation is restarted at any timing after a timing at which the web sheet 22 has passed by the wiping target head module 12A. Accordingly, ink in nozzles of the wiping target head module 12A is restrained from being dried after the end of a wiping process with respect to the nozzle surface 10A.

[7]

For the wiping target head module 12A, the tickling operation is stopped before a timing that is 0.2 seconds before a timing at which the web sheet 22 comes into contact with the wiping target head module 12A and is restarted after a timing that is 0.2 seconds after a timing at which the state of the web sheet 22 changes from a state of being in contact with the wiping target head module 12A to a state of not being in contact with the wiping target head module 12A. Accordingly, the tickling operation for the wiping target head module 12A can be stopped before the web sheet 22 comes into contact with the nozzle surface 10A of the wiping target head module 12A.

[8]

For the wiping target head module 12A, a negative pressure is set within such a range that no ink is drawn out from nozzles to a nozzle surface in the case of the wiping process with respect to the nozzle surface 10A. Accordingly, ink can be restrained from leaking or being erroneously jetted from the nozzles.

[9]

White ink containing titanium oxide as a pigment and black ink containing carbon black as a pigment are applied. Accordingly, in a case where a possibility that wear of the liquid-repellent films 10B is accelerated is high, the wear of the liquid-repellent films 10B can be suppressed.

[Configuration Example of Ink Jet Head]

Figure 5:
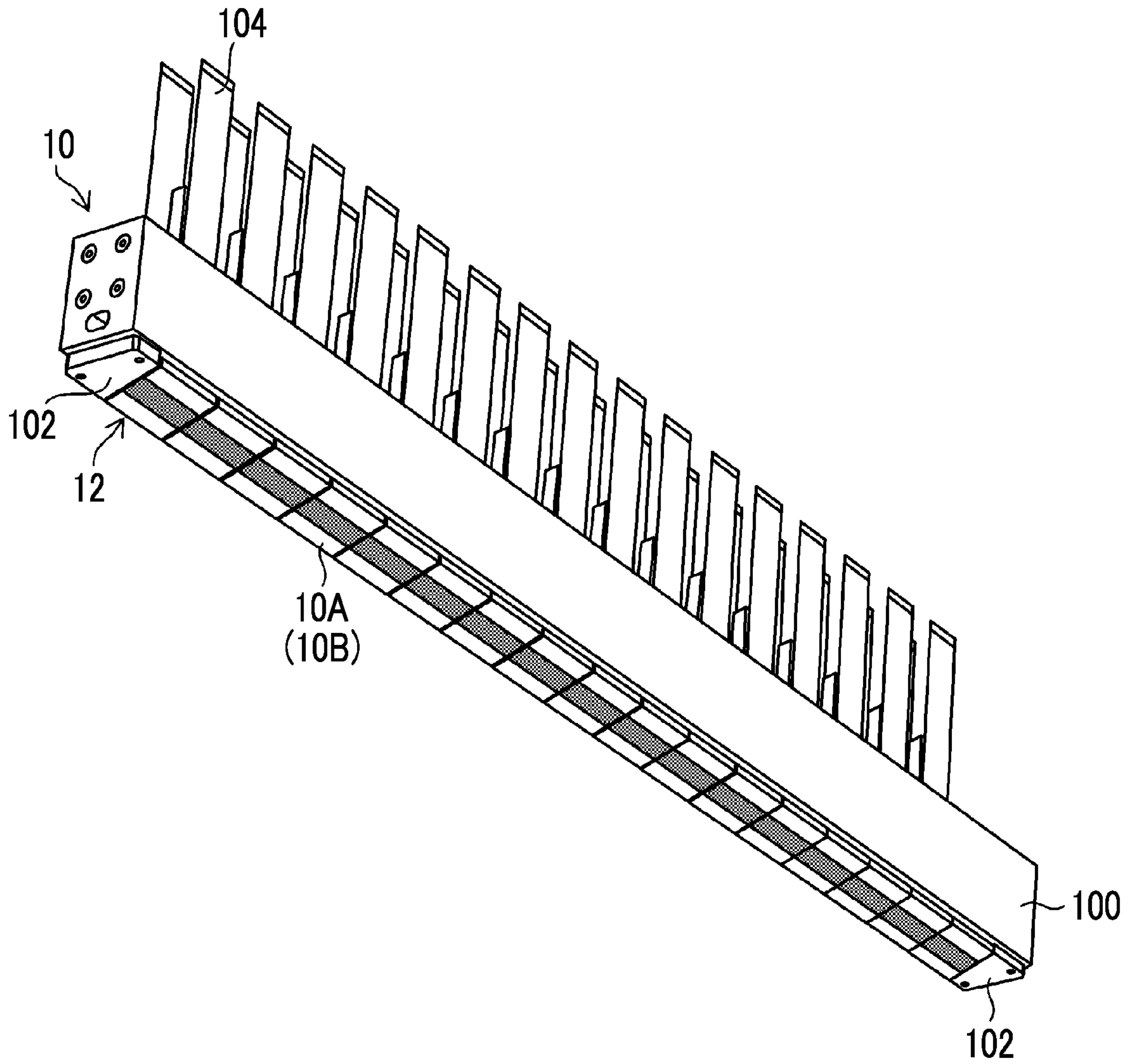
FIG. 5 is a perspective view showing a configuration example of an ink jet head.

FIG. 5 is a perspective view showing a configuration example of an ink jet head. The ink jet head 10 shown in the drawing has a structure in which the plurality of head modules 12 are connected to each other in a row along the longitudinal direction of the ink jet head 10. The plurality of head modules 12 are integrated and supported by means of a head frame 100.

Figure 6:
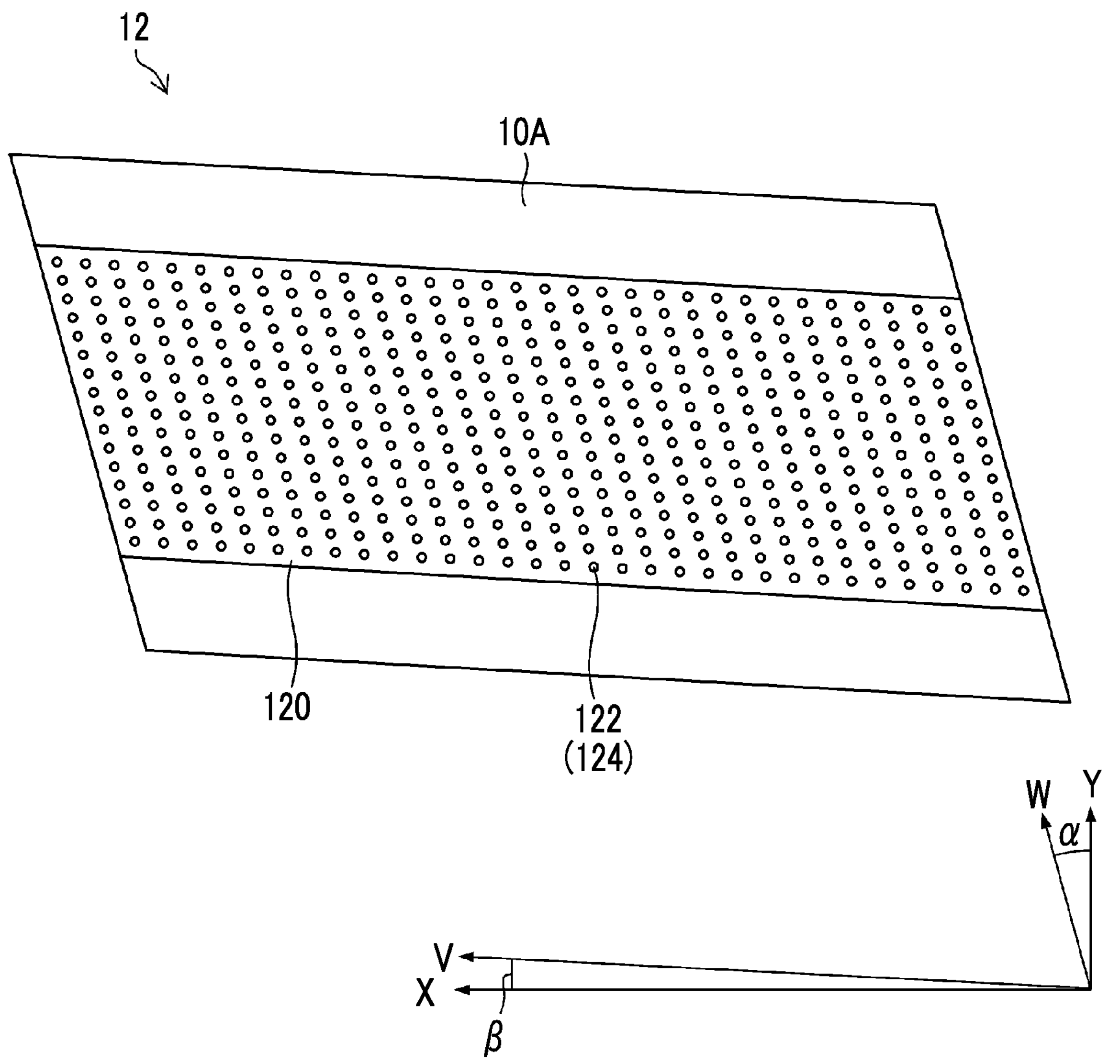
FIG. 6 is a plan view showing an example of the arrangement of nozzles of the ink jet head shown in FIG. 5.

The ink jet head 10 is a line head in which a plurality of nozzles are arranged in a paper width direction over a length corresponding to the total length of paper. Note that no nozzle is shown in FIG. 5. Nozzles are given a reference numeral 122 and are shown in FIG. 6. The paper width direction is a direction orthogonal to a paper transportation direction in a printing apparatus.

The planar shape of the nozzle surface 10A of the head module 12 is a parallelogram. Dummy plates 102 are attached to both ends of the head frame 100. The planar shape of the nozzle surfaces 10A of the ink jet head 10 including the head modules 12 and the dummy plates 102 is rectangular as a whole.

A flexible substrate 104 is attached to the head module 12. The flexible substrate 104 is a wiring member that transmits a drive voltage supplied to the head module 12. One end of the flexible substrate 104 is electrically connected to the head module 12 and the other end thereof is electrically connected to a drive voltage supply circuit. Note that the drive voltage supply circuit is not shown.

FIG. 6 is a plan view showing an example of the arrangement of nozzles of the ink jet head shown in FIG. 5. A central portion of the nozzle surface 10A of the head module 12 includes a belt-shaped nozzle arrangement portion 120. The nozzle arrangement portion 120 functions substantially as the nozzle surface 10A.

A plurality of nozzles 122 are arranged at the nozzle arrangement portion 120. Each of the nozzles 122 includes a nozzle opening 124 formed in the nozzle surface 10A. A structure example of the nozzle 122 will be described later. In the following description, "the arrangement of the nozzles 122" may be replaced with "the arrangement of the nozzle openings 124".

The planar shape of the head module 12 shown in FIG. 6 is a parallelogram including end surfaces that are close to long sides extending along a direction V that is inclined with respect to the paper width direction denoted by a reference numeral "X" at an angle β and end surfaces that are close to short sides extending along a direction W that is inclined with respect to the paper transportation direction denoted by a reference numeral "Y" at an angle α.

In the head module 12, the plurality of nozzles 122 are arranged in a matrix shape in a row direction along the direction V and a column direction along the direction W. The nozzles 122 may be arranged along a row direction along the paper width direction and a column direction diagonally intersecting the paper width direction.

In the case of the ink jet head 10 in which the plurality of nozzles 122 are arranged in a matrix shape, a projection nozzle row obtained by projecting each nozzle 122 in the matrix arrangement along a nozzle row direction can be considered to be equivalent to one nozzle row in which the nozzles 122 are arranged at approximately equal intervals at a density at which the maximum recording resolution in the nozzle row direction is achieved. The projection nozzle row is a nozzle row obtained by orthographically projecting each nozzle 122 in the matrix arrangement along the nozzle row direction.

The expression "approximately equal intervals" means substantially equal intervals as jetting points recordable in the printing apparatus. For example, the concept of "equal intervals" also includes a case where an interval or the like that is made slightly different in consideration of at least one of a manufacturing error or movement of liquid droplets on a substrate attributable to landing interference is included. The projection nozzle row corresponds to a substantial nozzle row. In consideration of the projection nozzle row, each nozzle 122 can be associated with a nozzle number denoting a nozzle position in an order in which projection nozzles are arranged along the nozzle row direction.

In the present embodiment, the line-type ink jet head 10 has been described as an example. However, application to a serial-type ink jet head is also possible.

FIG. 7 is a vertical cross-sectional view showing a three-dimensional structure of an ejector of the ink jet head shown in FIG. 5. An ejector 130 includes the nozzle 122, a pressure chamber 132 leading to the nozzle 122, and a piezoelectric element 134. The nozzle opening 124 communicates with the pressure chamber 132 via a nozzle flow path 136. The pressure chamber 132 communicates with a common tributary flow path 140 via an individual supply path 138.

A vibration plate 142 constituting a top surface of the pressure chamber 132 includes a conductive layer that corresponds to a lower electrode of the piezoelectric element 134 and functions as a common electrode. Note that the conductive layer is not shown. The pressure chamber 132, a wall portion of another flow path portion, the vibration plate 142, and the like can be made of silicon.

The material of the vibration plate 142 is not limited to silicon and the vibration plate 142 can be formed of a non-conductive material such as resin. The vibration plate 142 itself may be made of a metal material such as stainless steel to be a vibration plate serving as a common electrode also.

A piezoelectric unimorph actuator is composed of a structure in which the piezoelectric element 134 is laminated on the vibration plate 142. A drive voltage is applied to an individual electrode 144, which is an upper electrode of the piezoelectric element 134, so that a piezoelectric body 146 is deformed and the volume of the pressure chamber 132 is changed with the vibration plate 142 being bent. A change in pressure accompanied by a change in volume of the pressure chamber 132 acts on ink, so that the ink is jetted from the nozzle opening 124.

In a case where the piezoelectric element 134 returns to an original state after the ink is jetted, the pressure chamber 132 is filled with new ink from the common tributary flow path 140 through the individual supply path 138. An operation of filling the pressure chamber 132 with ink is called a refilling operation.

The shape of the pressure chamber 132 as seen in plan view is not particularly limited and may be various shapes such as a quadrangular shape, other polygonal shapes, a circular shape, and an elliptical shape. A cover plate 148 shown in FIG. 7 is a member that maintains a movable space 150 of the piezoelectric element 134 and seals the periphery of the piezoelectric element 134.

A supply side ink chamber and a recovery side ink chamber are formed above the cover plate 148. The supply side ink chamber is connected to a supply side common main flow path via a communication path. The recovery side ink chamber is connected to a recovery side common main flow path via the communication path.

Note that the supply side ink chamber, the recovery side ink chamber, the communication path, the supply side common main flow path, and the recovery side common main flow path are not shown. The ejector shown in FIG. 7 has the same meaning as a jetting element, a printing element, and the like.

[Ink Supply Unit]

Figure 8:
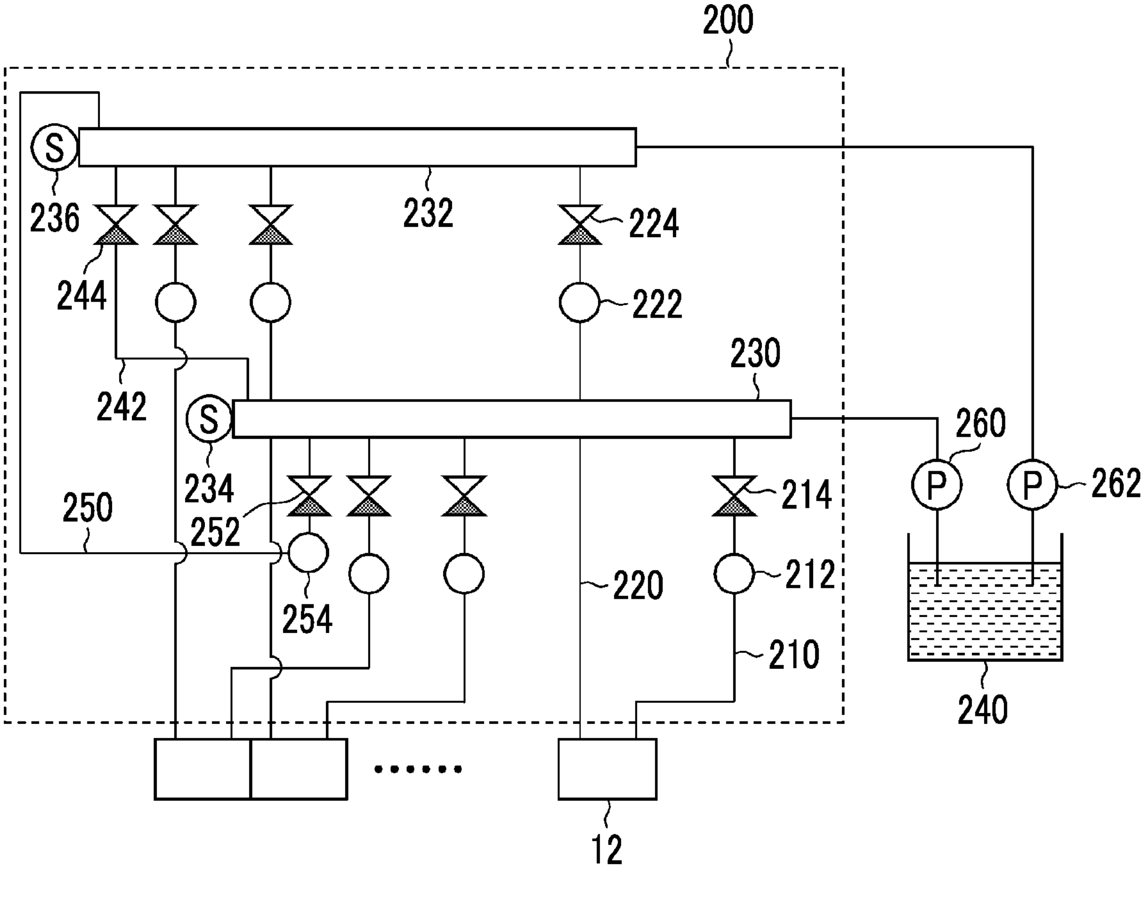
FIG. 8 is a block diagram showing a configuration example of an ink supply unit.

FIG. 8 is a block diagram showing a configuration example of an ink supply unit. An ink supply unit 200 shown in the drawing supplies ink to each head module 12 and circulates ink for each head module 12.

Each head module 12 is connected to a supply manifold 230 via a supply individual flow path 210. The supply individual flow path 210 includes a supply flow path damper 212 and a supply flow path valve 214. Note that, in FIG. 8, only a part of the supply individual flow path 210 and the like is given a reference numeral.

The supply flow path damper 212 suppresses pulsation of ink passing through the supply individual flow path 210. The supply flow path valve 214 performs the supplying and blocking of ink passing through the supply individual flow path 210 in accordance with a command signal transmitted from a control unit.

Each head module 12 is connected to a circulation manifold 232 via a circulation individual flow path 220. The circulation individual flow path 220 includes a circulation flow path damper 222 and a circulation flow path valve 224.

The circulation flow path damper 222 suppresses pulsation of ink passing through the circulation individual flow path 220. The circulation flow path valve 224 performs the supplying and blocking of ink passing through the circulation individual flow path 220 in accordance with a command signal transmitted from the control unit.

The supply manifold 230 is a primary storage flow path for ink supplied from an ink tank 240. The circulation manifold 232 is a primary storage flow path for ink through which ink is circulated from the ink jet head 10 to the ink tank 240.

The supply manifold 230 and the circulation manifold 232 communicate with each other via a first bypass flow path 242 and a second bypass flow path 250. The first bypass flow path 242 includes a first valve 244. The second bypass flow path 250 includes a second valve 252 and a damper 254.

The supply manifold 230 includes a supply pressure sensor 234. The circulation manifold 232 includes a circulation pressure sensor 236. A head control unit that controls the ink jet head 10 operates a supply pump 260 and a circulation pump 262 based on the result of pressure detection of the supply pressure sensor 234 and the circulation pressure sensor 236 and internal pressure settings of the ink jet head 10 to control the internal pressure of the ink jet head 10. Note that the internal pressure of the ink jet head 10 includes the negative pressure described above.

[Specific Example of Liquid-Repellent Film]

As the liquid-repellent film 10B of the nozzle surface 10A shown in FIG. 1, a liquid-repellent film containing a linear fluorine-containing silane coupling agent can be applied. The liquid-repellent film can be produced by using silicon as the material of a nozzle plate, forming a first organic film while using a silicon compound, which is a silicon compound containing no fluorine atom and is represented by Expression 1 or Expression 2, as a raw material, forming an inorganic oxide film on the first organic film, and forming a second organic film on the inorganic oxide film while using a linear fluorine-containing silane coupling agent as a raw material. The second organic film is liquid-repellent against ink.

$$X_{3-n}R^2_nSi—R^1—Z \quad \text{Expression 1}$$

However, in Expression 1, n=0, 1, or 2.

$$HN(SiR^3R^4R^5)_2 \quad \text{Expression 2}$$

X in Expression 1 is any of halogen excluding fluorine, a methoxy group, an ethoxy group, an acetoxy group, or a 2-methoxyethoxy group, and $R^2$ is an alkyl group having 1 to 3 carbon atoms.

$R^1$ is $C_mH_{2m}$, where m is a natural number of 1 to 20. Z is a group containing any of a methyl group, a vinyl group, an amino group, an epoxy group, a methacrylic group, an acryloyl group, a mercapto group, an isocyanate group, an acylthio group, or a ureide group. $R^3$, $R^4$, and $R^5$ in Expression 2 are alkyl groups having 1 to 3 carbon atoms.

The silicon compound has a boiling point that is equal to or higher than 20° C. and equal to or lower than 350° C. The linear fluorine-containing silane coupling agent is a compound represented by Expression 3.

$$X_{3-n}R^7_nSi—R^6—Z \quad \text{Expression 3}$$

However, in Expression 3, n=0, 1, or 2.

In Expression 3, X is any of halogen, a methoxy group, an ethoxy group, an acetoxy group, or a 2-methoxyethoxy group, $R^7$ is an alkyl group having 1 to 3 carbon atoms, and $R^6$ is a $C_pH_{2p}$ group where p is a natural number of 1 to 20 or a group containing a linear fluorocarbon chain and $C_qH_{2q}$ where q is a natural number of 1 to 20. Z is a group containing any of a methyl group, a vinyl group, an amino group, an epoxy group, a methacrylic group, an acryloyl group, a mercapto group, an isocyanate group, an acylthio group, a ureide group, or a trifluoromethyl group.

A self-assembled monolayer may be applied to at least one of the first organic film or the second organic film. In a step of forming the first organic film, the first organic film can be formed by applying a vapor phase method. As the inorganic oxide film, a silicon oxide film may be applied.

In a step of forming the inorganic oxide film, the inorganic oxide film can be formed by applying the vapor phase method. In a step of forming the second organic film, the second organic film can be formed by applying the vapor phase method.

The thickness of the first organic film and the thickness of the second organic film may be equal to or larger than 0.5 nanometers and equal to or smaller than 30 nanometers. The thickness of the first organic film and the thickness of the second organic film are preferably equal to or larger than 0.5 nanometers and equal to or smaller than 10 nanometers. The thickness of the first organic film and the thickness of the second organic film are more preferably equal to or larger than 0.5 nanometers and equal to or smaller than 5 nanometers.

As the thickness of the liquid-repellent film 10B, the thickness of the second organic film liquid-repellent against ink can be applied. The thickness of the liquid-repellent film 10B may be a thickness obtained by adding the thickness of the first organic film to the thickness of the second organic film. That is, the thickness of the liquid-repellent film 10B may be equal to or larger than 5 nanometers and equal to or smaller than 60 nanometers.

[Configuration Example of Ink Jet Printing Apparatus]

Next, a liquid jetting apparatus to which the head maintenance method according to the embodiment is applied will be described. In the following description, an ink jet printing apparatus will be described as the liquid jetting apparatus.

[Overall Configuration of Ink Jet Printing Apparatus]

Figure 9:
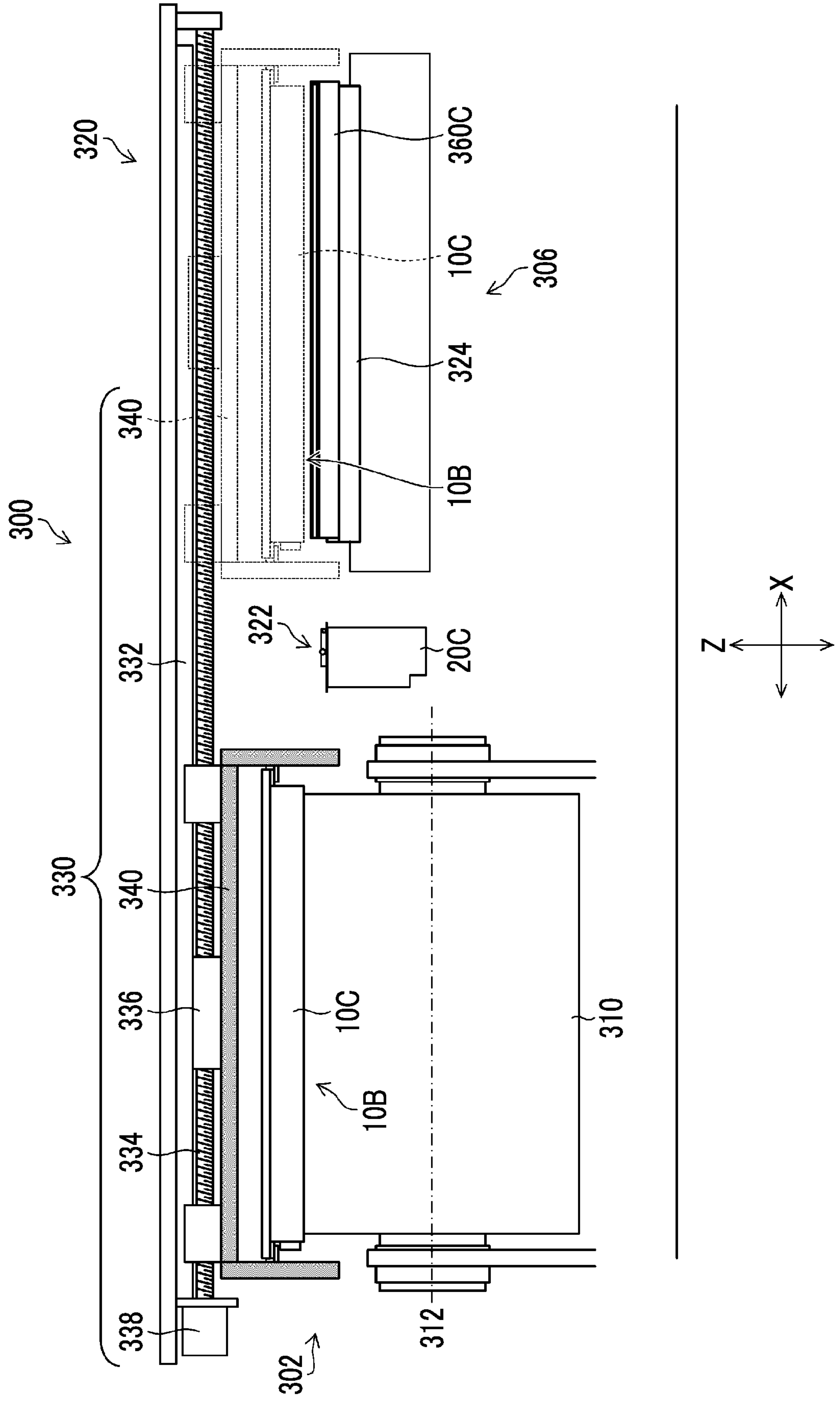
FIG. 9 is a front view of an ink jet printing apparatus.
Figure 10:
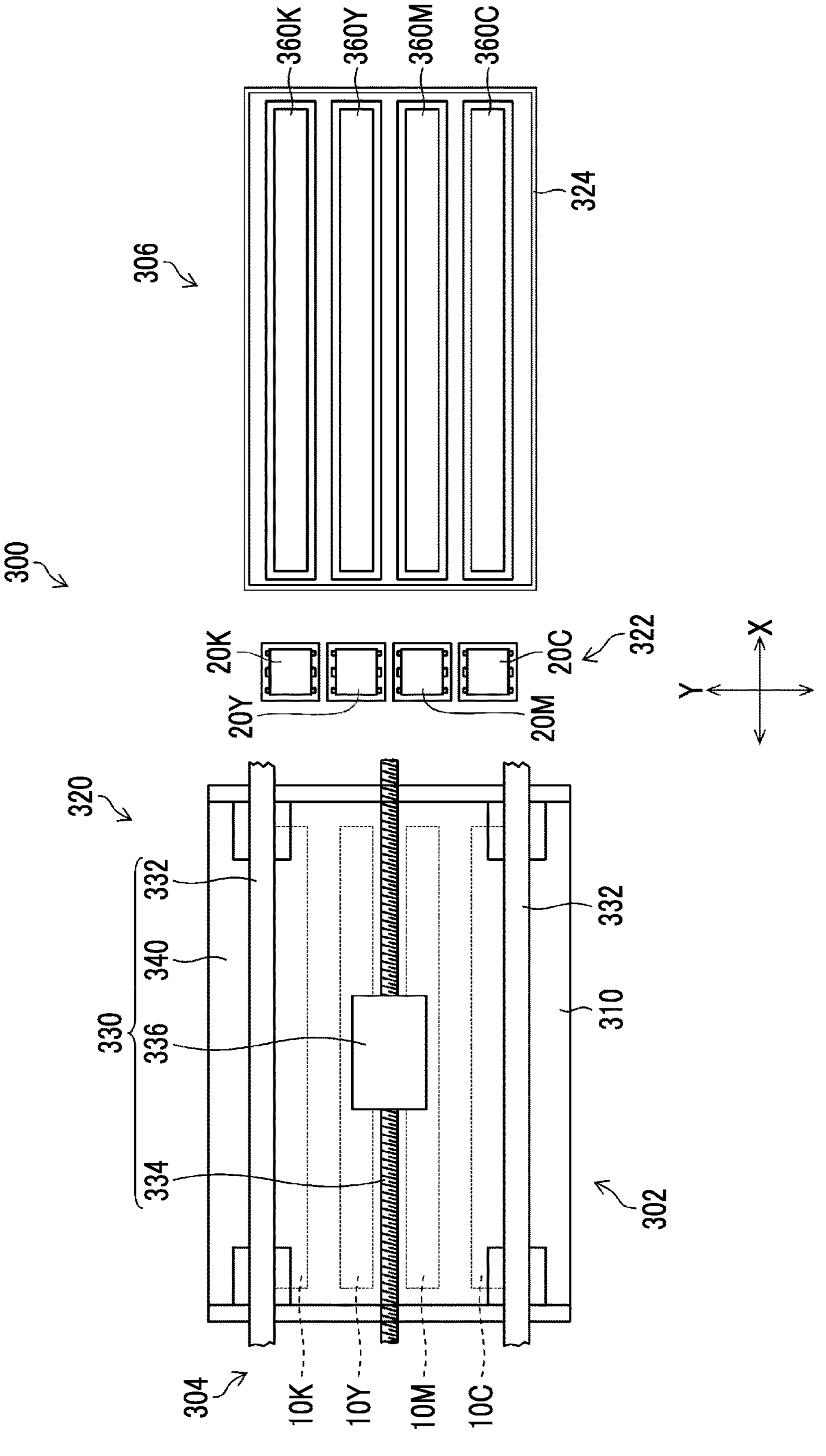
FIG. 10 is a top view of the ink jet printing apparatus shown in FIG. 9.

FIG. 9 is a front view of an ink jet printing apparatus. FIG. 10 is a top view of the ink jet printing apparatus shown in FIG. 9. An ink jet printing apparatus 300 includes a paper transportation unit 302, a printing unit 304, and a maintenance unit 306. The paper transportation unit 302 includes a printing drum 310. The ink jet printing apparatus 300 includes a paper feeding unit and a paper discharging unit. The paper feeding unit supplies paper to be used for printing to the paper transportation unit 302. The paper discharging unit accumulates paper on which printing has been performed. Note that the paper feeding unit and the paper discharging unit are not shown.

Regarding the printing drum 310, a plurality of adsorption holes are formed in a paper supporting region on which paper is supported. The plurality of adsorption holes are connected to a suction pump via gas flow paths. A rotary supporting shaft 312 of the printing drum 310 is connected to a rotary shaft of a motor via a connection member.

In the ink jet printing apparatus 300, the rotary shaft of the motor is rotated in a prescribed rotation direction based on a control signal so that the printing drum 310 is rotated in a prescribed rotation direction and paper supported on the paper supporting region of the printing drum 310 is transported along a prescribed transport path. Note that in FIGS. 9 and 10, the paper supporting region, the adsorption holes, the gas flow paths, the suction pump, and the connection member are not shown.

The printing unit 304 performs printing on paper transported by means of the paper transportation unit 302. The printing unit 304 includes ink jet heads that jet cyan ink, magenta ink, yellow ink, and black ink, respectively.

An ink jet head 10C shown in FIG. 10 jets cyan ink. An ink jet head 10M jets magenta ink. An ink jet head 10Y jets yellow ink. An ink jet head 10K jets black ink.

In the following description, a term "the ink jet head 10" will be used as a generic term indicating the ink jet head 10C and the like or a term indicating any one of the ink jet head 10C and the like in a case where the ink jet head 10C and the like do not need to be distinguished from each other.

A drop-on-demand method is applied to the ink jet head 10. Regarding the ink jet head 10, the jetting of ink is controlled based on a jetting drive voltage supplied from a printing control unit shown in FIG. 11. In addition, regarding the ink jet head 10, the tickling operation is controlled based on a drive voltage for the tickling operation which is supplied from the printing control unit.

The maintenance unit 306 includes a head moving mechanism 320, a wiping unit 322, and a cap unit 324. The head moving mechanism 320 collectively moves the ink jet head 10C and the like.

The head moving mechanism 320 includes a horizontal moving mechanism 330. The horizontal moving mechanism 330 includes guide rails 332, a ball screw 334, a nut 336, a motor 338, and a pair of frames 340. The head moving mechanism 320 includes a raising and lowering mechanism. The raising and lowering mechanism collectively raises and lowers the ink jet head 10C and the like. The raising and lowering mechanism is not shown.

The horizontal moving mechanism 330 causes the ink jet head 10C and the like to reciprocate between a printing position and a capping position within a plane parallel to a horizontal plane along a horizontal direction. The printing position is a position directly above the printing drum 310 and is the position of the ink jet head 10C and the like in the case of a printing operation. The capping position is a position directly above the cap unit 324 and is the position of the ink jet head 10C and the like in the case of a capping operation.

The ink jet head 10C and the like are integrally supported by means of the frame 340. The frame 340 is connected to the nut. The motor 338 is operated to rotate the ball screw 334. The frame 340 connected to the nut 336 moves in the horizontal direction and the ink jet head 10C and the like move in the horizontal direction within the plane parallel to the horizontal plane. As the motor, a control type motor of which rotation and stoppage can be controlled by means of a command signal like a stepping motor and a servomotor is applied.

The wiping unit 322 includes a wiping device 20C, a wiping device 20M, a wiping device 20Y, and a wiping device 20K shown in FIG. 10. The wiping device 20C wipes the nozzle surfaces 10A of the ink jet head 10C. The wiping device 20M, the wiping device 20Y, and the wiping device 20K wipe the nozzle surfaces 10A of the ink jet head 10M, the nozzle surfaces 10A of the ink jet head 10*y*, and the nozzle surfaces 10A of the ink jet head 10K, respectively.

The wiping device 20 shown in FIG. 1 and the like corresponds to any one of the wiping device 20C, the wiping device 20M, the wiping device 20Y, and the wiping device 20K shown in FIG. 10. The wiping unit 322 in the embodiment corresponds to an example of a wiping processing unit.

The cap unit 324 includes a cap 360C, a cap 360M, a cap 360Y, and a cap 360K. The cap 360C caps the ink jet head 10C. The cap 360M, the cap 360Y, and the cap 360K cap the ink jet head 10M, the ink jet head 10Y, and the ink jet head 10K, respectively.

The frame 340 and the ink jet head 10C and the like denoted by broken lines in FIG. 9 show the ink jet head 10C and the like in a state of being capped by means of the cap 360C.

[Description on Functional Block of Ink Jet Printing Apparatus]

Figure 11:
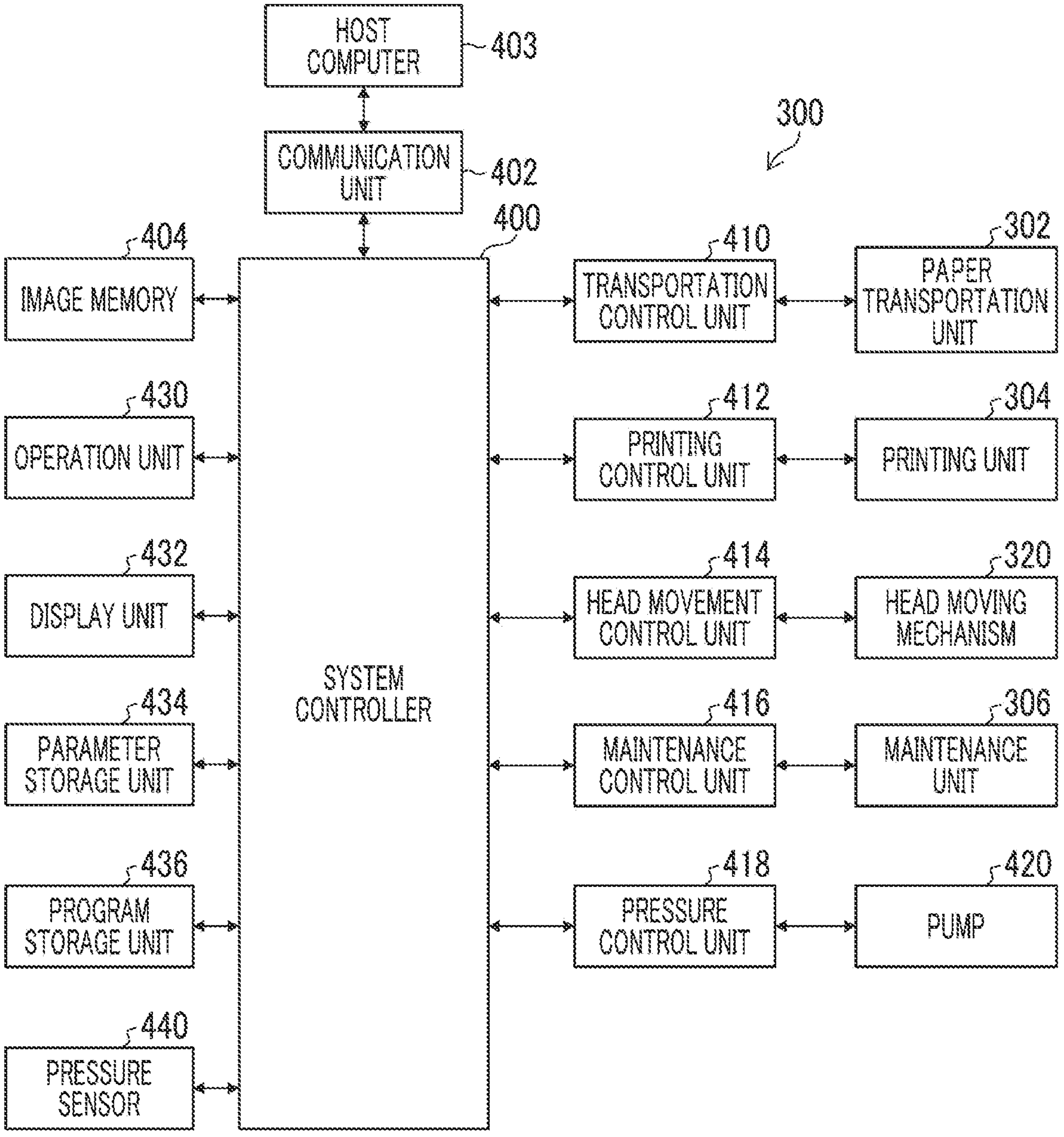
FIG. 11 is a functional block diagram of the ink jet printing apparatus.

FIG. 11 is a functional block diagram of the ink jet printing apparatus. The ink jet printing apparatus 300 includes a system controller 400. The system controller 400 functions as an overall control unit that collectively controls each part of the ink jet printing apparatus 300. In addition, the system controller 400 functions as a calculation unit that performs various calculation processes.

The system controller 400 may execute a program to control each part of the ink jet printing apparatus 300. Furthermore, the system controller 400 functions as a memory controller that controls the reading and writing of data in a memory such as a read only memory (ROM) and a random access memory (RAM).

The ink jet printing apparatus 300 includes a communication unit 402 and an image memory 404. The communication unit 402 includes a communication interface (not shown). The communication unit 402 can transmit and receive data to and from a host computer 403 connected to the communication interface.

The image memory 404 functions as a temporary storage unit for various data including image data. Data is read and written from and in the image memory 404 through the system controller 400. Image data loaded from the host computer 403 via the communication unit 402 is temporarily stored in the image memory 404.

The ink jet printing apparatus 300 includes a transportation control unit 410, a printing control unit 412, a head movement control unit 414, a maintenance control unit 416, and a pressure control unit 418. The transportation control unit 410 controls the operation of the paper transportation unit 302 in accordance with a command from the system controller 400.

The printing control unit 412 controls the operation of the printing unit 304 in accordance with a command from the system controller 400. That is, the printing control unit 412 controls the jetting of ink of the ink jet head 10 shown in FIG. 1 and the like.

The printing control unit 412 includes an image processing unit. The image processing unit forms dot data based on input image data. The image processing unit includes a color separation processing unit, a color conversion processing unit, a correction processing unit, and a halftone processing unit. Note that the image processing unit, the color separation processing unit, the color conversion processing unit, the correction processing unit, and the halftone processing unit are not shown.

The color separation processing unit performs color separation processing on the input image data. For example, in a case where the input image data is represented by RGB, the color separation processing unit decomposes the input image data into data for each of RGB colors. Here, R represents red. G represents green. B represents blue.

The color conversion processing unit converts image data for each color obtained through the decomposition into red, green, and blue into cyan, magenta, yellow, and black corresponding to ink colors.

The correction processing unit performs correction processing on image data for each color obtained through the conversion into cyan, magenta, yellow, and black. Examples of the correction processing include gamma correction processing, density unevenness correction processing, abnormal recording element correction processing, and the like.

The halftone processing unit converts, for example, image data represented by a multi-gradation number such as 0 to 255 into dot data represented by a binary value or a multiple value of a ternary value or more that is less than the number of gradations of the input image data.

A predetermined halftone processing rule is applied to the halftone processing unit. Examples of the halftone processing rule include a dither method, an error diffusion method, and the like. The halftone processing rule may be changed depending on image recording conditions, the content of the image data, and the like.

The printing control unit 412 includes a waveform generation unit, a waveform storage unit, and a drive circuit which are not shown. The waveform generation unit generates the waveform of drive voltage. The waveform storage unit stores the waveform of the drive voltage. The drive circuit generates a drive voltage having a drive waveform corresponding to the dot data. The drive circuit supplies the drive voltage to the ink jet head 10.

That is, a jetting timing and an ink jetting amount for each pixel position are determined based on dot data generated through processing performed by using the image processing unit. A drive voltage corresponding to the jetting timing and the ink jetting amount for each pixel position and a control signal for determining a jetting timing for each pixel are generated. The drive voltage is supplied to the ink jet head 10 and ink is jetted from the ink jet head 10. The ink jetted from the ink jet head 10 forms dots.

The head movement control unit 414 operates the head moving mechanism 320 in cooperation with the maintenance control unit 416 in accordance with a command from the system controller 400. The head movement control unit 414 may include a raising and lowering control unit that controls the raising and lowering mechanism and a horizontal movement control unit that controls the horizontal moving mechanism 330. The head movement control unit 414 in the embodiment corresponds to an example of a component of the head control unit.

The maintenance control unit 416 operates the maintenance unit 306 in accordance with a command from the system controller 400. The maintenance control unit 416 may include a wiping control unit that controls the wiping unit 322 and a cap control unit that controls the cap unit 324. The maintenance control unit 416 may include the head movement control unit 414.

The maintenance control unit 416 raises and lowers the wiping unit 322 in accordance with the position of the ink jet head 10 in a head movement path. That is, the maintenance control unit 416 raises the wiping unit 322 to a wiping processing position at which the web sheet 22 of the wiping unit 322 comes into contact with the nozzle surfaces 10A of the ink jet head 10 in a period of time in which the ink jet head 10 passes through a wiping position of the wiping unit 322. After the ink jet head 10 passes through the wiping position of the wiping unit 322, the wiping unit 322 is lowered from the wiping processing position to a standby position.

The maintenance control unit 416 derives the position of the ink jet head 10 in the head movement path by using the moving speed of the ink jet head 10 and an elapsed period of time from the start of movement of the ink jet head 10.

The maintenance control unit 416 controls the tickling operation for the ink jet head 10 in cooperation with the printing control unit 412, in accordance with the position of the ink jet head 10 in the head movement path.

That is, the maintenance control unit 416 performs the tickling operation of the ink jet head 10 in cooperation with the printing control unit 412 in a case where the ink jet printing apparatus 300 is switched to a maintenance mode.

In the maintenance mode, the maintenance control unit 416 controls stoppage and restart of the tickling operation for each head module 12 in cooperation with the printing control unit 412. The printing control unit 412 and the maintenance control unit 416 in the embodiment correspond to an example of components of the head control unit.

The pressure control unit 418 adjusts the internal pressure of the ink jet head 10 in accordance with a command transmitted from the system controller 400. That is, the pressure control unit 418 controls the operation of a pump 420 based on the result of pressure detection that is transmitted from a pressure sensor 440.

The pressure control unit 418 controls the operation of the pump 420 based on the result of pressure detection that is transmitted from the pressure sensor 440. The pump 420 shown in FIG. 11 corresponds to the supply pump 260 and the circulation pump 262 shown in FIG. 9. In addition, the pressure sensor 440 corresponds to the supply pressure sensor 234 and the circulation pressure sensor 236. The pressure control unit 418 in the embodiment corresponds to an example of the head control unit. In addition, the pressure control unit 418 corresponds to an example of a negative pressure setting unit.

The ink jet printing apparatus 300 includes an operation unit 430. The operation unit 430 includes an operation member such as an operation button, a keyboard, and a touch panel. The operation unit 430 may include a plurality of types of operation members. Note that the operation member is not shown.

Information input via the operation unit 430 is sent to the system controller 400. The system controller 400 executes various processes in accordance with the information sent from the operation unit 430.

The ink jet printing apparatus 300 includes a display unit 432. The display unit 432 includes a display device such as a liquid crystal panel and a display driver. The display device and the display driver are not shown. The display unit 432 causes the display device to display various information such as various setting information and abnormality information of the apparatus in accordance with a command from the system controller 400.

The ink jet printing apparatus 300 includes a parameter storage unit 434. The parameter storage unit 434 stores various parameters used in the ink jet printing apparatus 300. The various parameters stored in the parameter storage unit 434 are read via the system controller 400 and set for each part of the apparatus.

The ink jet printing apparatus 300 includes a program storage unit 436. The program storage unit 436 stores programs used for each part of the ink jet printing apparatus 300. The various programs stored in the program storage unit 436 are read via the system controller 400 and executed in each part of the apparatus.

Each control unit such as the system controller 400 and the transportation control unit 410 shown in FIG. 11 executes a prescribed program by using hardware described below to realize the functions of the ink jet printing apparatus 300. Various processors can be applied to the hardware of each control unit. Examples of the processors include a central processing unit (CPU) and a graphics processing unit (GPU). The CPU executes a program to function as various processing units.

The CPU is a general-purpose processor. The GPU is a processor specialized in image processing. As the hardware of the processors, an electric circuit in which electric circuit elements such as semiconductor elements are combined with each other is applied. Each control unit includes a ROM in which a program or the like is stored and a RAM which is a work area for various operations.

Two or more processors may be applied with respect to one control unit. The two or more processors may be the same types of processors or different types of processors. In addition, one processor may be applied with respect to a plurality of control units.

Paper applied to the ink jet printing apparatus 300 may be a sheet of paper or continuous paper. As the paper, not only a paper medium but also a resin sheet, a metal sheet, and the like can be applied. The paper transportation unit 302 of the ink jet printing apparatus 300 may perform plane transportation of paper by using a transportation belt or the like.

In the present embodiment, the ink jet printing apparatus 300 that prints an image on paper has been described as an example of a liquid jetting apparatus. However, the functions of the ink jet printing apparatus 300 according to the present embodiment can be realized also in a pattern forming apparatus that forms a pattern on a substrate or the like by using liquid having functionality.

[Procedure for Head Maintenance Method]

Figure 12:
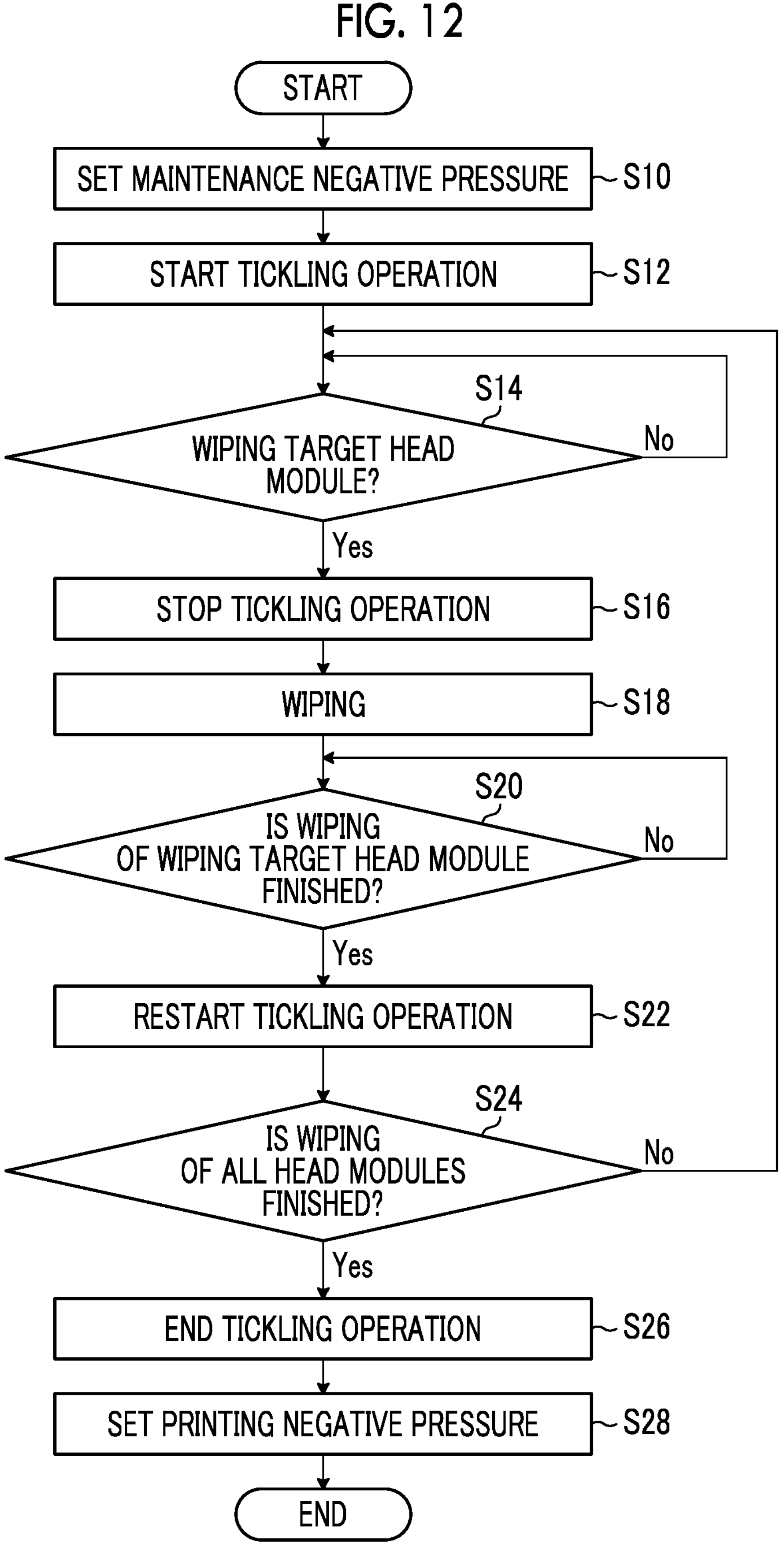
FIG. 12 is a flowchart showing the procedure for the head maintenance method according to the embodiment.

FIG. 12 is a flowchart showing the procedure for the head maintenance method according to the embodiment. In the case of a switch to the maintenance mode, the maintenance mode of the ink jet printing apparatus 300 is performed.

In maintenance of the ink jet head 10, a wiping process with respect to the nozzle surfaces 10A, a suction process performed by using the cap unit 324, and a purging process performed by using the cap unit 324 may be performed. FIG. 12 shows the procedure for the wiping process with respect to the nozzle surfaces 10A in the maintenance of the ink jet head 10.

The wiping process with respect to the nozzle surfaces 10A of the ink jet head 10 is started. In a maintenance negative pressure setting step S10, the maintenance control unit 416 shown in FIG. 11 sets a negative pressure corresponding to the wiping process with respect to the nozzle surfaces 10A in cooperation with the pressure control unit 418. After the maintenance negative pressure setting step S10, the process proceeds to a tickling operation start step S12. Note that the maintenance negative pressure setting step S10 in the embodiment corresponds to an example of the negative pressure applying step.

In the tickling operation start step S12, the maintenance control unit 416 starts the tickling operation for all of the head modules 12 in cooperation with the printing control unit 412. After the tickling operation start step S12, the process proceeds to a wiping target determination step S14. The tickling operation start step S12 described in the embodiment corresponds to an example of a non-jetting driving step.

In the wiping target determination step S14, the maintenance control unit 416 determines, for each of all of the head modules 12 provided in the ink jet head 10, whether or not the head module 12 is the wiping target head module 12A, in a prescribed order.

In the wiping target determination step S14, the result of the determination is No in a case where the maintenance control unit 416 determines that the head module 12 that is the target of the determination is not the wiping target head module 12A. In a case where the result of the determination is No, the wiping target determination step S14 is repeated until the result of the determination in the wiping target determination step S14 becomes Yes.

Meanwhile, in the wiping target determination step S14, the result of the determination is Yes in a case where the maintenance control unit 416 determines that the head module 12 that is the target of the determination is the wiping target head module 12A. In a case where the result of the determination is Yes, the process proceeds to a tickling operation stoppage step S16.

In the tickling operation stoppage step S16, the maintenance control unit 416 stops the tickling operation for the wiping target head module 12A in cooperation with the printing control unit 412. After the tickling operation stoppage step S16, the process proceeds to a wiping step S18. The tickling operation stoppage step S16 described in the embodiment corresponds to an example of the non-jetting driving step.

In the wiping step S18, the maintenance control unit 416 performs a wiping process with respect to the nozzle surface 10A of the wiping target head module 12A. After the wiping step S18, the process proceeds to a wiping end determination step S20. In the wiping end determination step S20, the maintenance control unit 416 determines whether or not the wiping process with respect to the wiping target head module 12A is finished. In the wiping end determination step S20, the result of the determination is No in a case where the maintenance control unit 416 determines that the wiping process with respect to the wiping target head module 12A is not finished. In a case where the result of the determination is No, the wiping end determination step S20 is repeated until the result of the determination in the wiping end determination step S20 becomes Yes.

Meanwhile, in the wiping end determination step S20, the result of the determination is Yes in a case where the maintenance control unit 416 determines that the wiping process with respect to the wiping target head module 12A is finished. In a case where the result of the determination is Yes, the process proceeds to a tickling operation restart step S22.

In the tickling operation restart step S22, the maintenance control unit 416 restarts the tickling operation for the wiping target head module 12A of which the wiping process is finished, in cooperation with the printing control unit 412. After the tickling operation restart step S22, the process proceeds to an all-module wiping end determination step S24.

In the all-module wiping end determination step S24, the maintenance control unit 416 determines whether or not the wiping process with respect to the nozzle surface 10A is finished for all of the head modules 12. In the all-module wiping end determination step S24, the result of the determination is No in a case where the maintenance control unit 416 determines that the wiping process with respect to the nozzle surface 10A is not finished for all of the head modules 12. In a case where the result of the determination is No, the process proceeds to the wiping target determination step S14 and steps of the wiping target determination step S14 to the all-module wiping end determination step S24 are repeatedly performed until the result of the determination in the all-module wiping end determination step S24 becomes Yes.

Meanwhile, in the all-module wiping end determination step S24, the result of the determination is Yes in a case where the maintenance control unit 416 determines that the wiping process with respect to the nozzle surface 10A is finished for all of the head modules 12. In a case where the result of the determination is Yes, the process proceeds to a tickling operation end step S26.

In the tickling operation end step S26, the maintenance control unit 416 ends the tickling operation for all of the head modules 12 in cooperation with the printing control unit 412. After the tickling operation end step S26, the process proceeds to a printing negative pressure setting step S28.

In the printing negative pressure setting step S28, the maintenance control unit 416 sets a negative pressure of the ink jet head 10 to a negative pressure in a printing mode in cooperation with the pressure control unit 418. After the printing negative pressure setting step S28, a prescribed end process is performed and the maintenance control unit 416 ends the wiping process with respect to the nozzle surfaces 10A.

[Example of Application to Head Device]

A head device may be configured by applying a portion of components of the ink jet printing apparatus 300 described with reference to FIGS. 9 to 11. That is, the head device according to the embodiment includes the ink jet head 10 and the head control unit.

The head control unit includes the system controller 400, the communication unit 402, the printing control unit 412, and the pressure control unit 418 shown in FIG. 11. The head device performs tickling operation control of the ink jet head 10 in cooperation with a maintenance device of the ink jet head 10.

[Example of Application to Program Invention]

A program corresponding to the head device, the ink jet printing apparatus, and the head maintenance method disclosed in the present specification can be configured. That is, it is possible to configure a program that causes a computer to realize the functions of each part shown in FIG. 11 and the like and the functions of each part shown in FIG. 12.

For example, it is possible to configure a program that causes a computer to realize a negative pressure setting function corresponding to the maintenance negative pressure setting step S10 and the printing negative pressure setting step S28 shown in FIG. 12 and a tickling operation switching function corresponding to the tickling operation start step S12, the tickling operation stoppage step S16, and the tickling operation end step S26.

Regarding the embodiment of the present invention described above, the configuration requirements can be appropriately changed, added, or deleted without departing from the spirit of the present invention. The present invention is not limited to the embodiments described above, and various modifications can be made by a person having ordinary knowledge in the art within the technical idea of the present invention.

EXPLANATION OF REFERENCES

10: ink jet head
10A: nozzle surface
10B: liquid-repellent film
10C: ink jet head
10M: ink jet head
10Y: ink jet head
10K: ink jet head
12: head module
12A: wiping target head module
12B: tickling continuation region
12C: non-wiping target head module to be wiped next
20: wiping device
20C: wiping device
20M: wiping device
20Y: wiping device
20K: wiping device
22: web sheet
22A: web sheet contact region
24: pressing roller
26: biasing unit
100: head frame
102: dummy plate
104: flexible substrate
120: nozzle arrangement portion
122: nozzle
124: nozzle opening
130: ejector
132: pressure chamber
134: piezoelectric element
136: nozzle flow path
138: individual supply path
140: supply side common tributary flow path
142: vibration plate
144: individual electrode
146: piezoelectric body
148: cover plate
150: movable space
200: ink supply unit
210: supply individual flow path
212: supply flow path damper
214: supply flow path valve
220: circulation individual flow path
224: circulation flow path valve
230: supply manifold
232: circulation manifold
236: circulation pressure sensor
240: ink tank
242: first bypass flow path
244: first valve
250: second bypass flow path
252: second valve
254: damper
260: supply pump
262: circulation pump
300: ink jet printing apparatus
302: paper transportation unit
304: printing unit
306: maintenance unit
310: printing drum
312: rotary supporting shaft
320: head moving mechanism
322: wiping unit
324: cap unit
330: horizontal moving mechanism
332: guide rail
334: ball screw
336: nut
338: motor
340: frame
360C: cap
360M: cap
360Y: cap
360K: cap
400: system controller
402: communication unit
403: host computer
404: image memory
410: transportation control unit
412: printing control unit
414: head movement control unit
416: maintenance control unit
418: pressure control unit
430: operation unit
432: display unit
434: parameter storage unit
436: program storage unit
S10 to S28: each step in head maintenance method

What is claimed is:

1. A head device comprising:

an ink jet head in which a liquid-repellent film is formed on a nozzle surface; and a head controller configured to control the ink jet head while cleaning the nozzle surface at least by:

applying a negative pressure to liquid in a nozzle, performing a non-jetting driving operation of causing the liquid in the nozzle to vibrate without being jetted, and while maintaining the negative pressure, stopping the non-jetting driving operation for a wiping target nozzle with which a wiping member to be used in a wiping process comes into contact in a case where the wiping process with respect to the nozzle surface is to be performed.

2. The head device according to claim 1,
wherein the head controller is configured to continue the non-jetting driving operation for a non-target nozzle with which the wiping member is not in contact.

3. The head device according to claim 1,
wherein the ink jet head includes a plurality of head modules and has a structure in which the plurality of head modules are connected to each other, and
the head controller is configured to stop the non-jetting driving operation for a wiping target head module, to which the wiping target nozzle belongs, in a case where the wiping process is to be performed.

4. The head device according to claim 3, wherein the head controller is configured to continue the non-jetting driving operation for a non-target head module other than the wiping target head module.

5. The head device according to claim 4,
wherein the head controller is configured to perform the non-jetting driving operation for the wiping target head module after a timing at which contact between the wiping member and the wiping target head module ends.

6. The head device according to claim 5,
wherein the head controller is configured to perform the non-jetting driving operation for the wiping target head module at least 0.2 seconds after the timing at which the contact between the wiping member and the wiping target head module ends.

7. The head device according to claim 3,
wherein the head controller is configured to stop the non-jetting driving operation for the wiping target head module before a timing at which the wiping member starts to come into contact with the wiping target head module.

8. The head device according to claim 7,
wherein the head controller is configured to stop the non-jetting driving operation for the wiping target head module at least 0.2 seconds before the timing at which the wiping member starts to come into contact with the wiping target head module.

9. The head device according to claim 1,
wherein a negative pressure setting unit that sets the negative pressure sets the negative pressure in a case of the wiping process to fall within such a range that the liquid is not drawn out from the nozzle in a case where the non-jetting driving operation is stopped.

10. The head device according to claim 9,
wherein the negative pressure setting unit sets the negative pressure in the case of the wiping process to −5000 kilopascals or more and −500 kilopascals or less.

11. The head device according to claim 1,
wherein at least one of liquid containing carbon black or liquid containing titanium oxide is used for the ink jet head.

12. A liquid jetting apparatus comprising:
an ink jet head in which a liquid-repellent film is formed on a nozzle surface;
a head controller configured to control the ink jet head; and
a wiping processing unit that performs a wiping process with respect to the nozzle surface,
wherein the head controller configured to control the ink jet head while cleaning the nozzle surface at least by:
applying a negative pressure to liquid in a nozzle,
performing a non-jetting driving operation of causing the liquid in the nozzle to vibrate without being jetted, and
while maintaining the negative pressure, stopping the non-jetting driving operation for a wiping target nozzle with which a wiping member to be used in the wiping process comes into contact in a case where the wiping process with respect to the nozzle surface is to be performed by the wiping processing unit.

* * * * *